(12) United States Patent
Prochazka, Jr. et al.

(10) Patent No.: US 9,437,855 B2
(45) Date of Patent: Sep. 6, 2016

(54) LITHIUM ACCUMULATOR AND THE METHOD OF PRODUCING THEREOF

(75) Inventors: Jan Prochazka, Jr., Kamenne Zehrovice (CZ); Jan Prochazka, Kemenne Zehrovice (CZ)

(73) Assignee: HE3DA s.r.o., Prague (CZ)

( * ) Notice: Subject to any disclaimer, the term of this patent is extended or adjusted under 35 U.S.C. 154(b) by 1071 days.

(21) Appl. No.: 12/998,090

(22) PCT Filed: Sep. 18, 2009

(86) PCT No.: PCT/CZ2009/000112
§ 371 (c)(1),
(2), (4) Date: Mar. 16, 2011

(87) PCT Pub. No.: WO2010/031363
PCT Pub. Date: Mar. 25, 2010

(65) Prior Publication Data
US 2011/0165457 A1    Jul. 7, 2011

(30) Foreign Application Priority Data
Sep. 19, 2008    (CS) .................................. 2008-572

(51) Int. Cl.
*H01M 10/04* (2006.01)
*H01M 10/0525* (2010.01)
(Continued)

(52) U.S. Cl.
CPC ............ *H01M 2/1646* (2013.01); *H01M 4/043* (2013.01); *H01M 4/485* (2013.01); *H01M 4/505* (2013.01); *H01M 10/0422* (2013.01);
(Continued)

(58) Field of Classification Search
CPC ................................................. H01M 10/0562
USPC ............................................. 429/165, 231.95
See application file for complete search history.

(56) References Cited

U.S. PATENT DOCUMENTS 5,795,680 A * 8/1998 Ikeda et al. ................... 429/245
5,879,834 A * 3/1999 Mao .............................. 429/332
(Continued)

FOREIGN PATENT DOCUMENTS

DE    10 2008 034 867    1/2010
EP    1 244 168    9/2002
(Continued)

OTHER PUBLICATIONS

International Search Report.

*Primary Examiner* — Barbara Gilliam
*Assistant Examiner* — Robert S Carrico
(74) *Attorney, Agent, or Firm* — Collard & Roe, P.C.

(57) ABSTRACT

A lithium accumulator includes at least two three-dimensional electrodes separated by a separator and encased together into an accumulator body with an electrolyte that is a non-aqueous solution of a lithium salt in an organic polar solvent. The two electrodes have a minimum thickness of 0.5 mm each. At least one electrode is a homogenous, compressed mixture of an electron conductive component and an active material. The active material is capable of absorbing and extracting lithium in the presence of electrolyte. The porosity of the pressed electrodes is 25 to 90%. The active material has morphology of hollow spheres with a wall thickness of maximum 10 micrometers, or morphology of aggregates or agglomerates of maximum 30 micrometers in size. The separator includes a highly porous electrically insulating ceramic material with open pores and porosity from 30 to 95%.

6 Claims, 17 Drawing Sheets

(51) Int. Cl.
  *H01M 2/16*    (2006.01)
  *H01M 4/04*    (2006.01)
  *H01M 4/485*   (2010.01)
  *H01M 4/505*   (2010.01)
  *H01M 10/052*  (2010.01)
  *H01M 4/02*    (2006.01)

(52) U.S. Cl.
  CPC ...... *H01M10/052* (2013.01); *H01M 2004/021* (2013.01); *Y02E 60/122* (2013.01); *Y02P 70/54* (2015.11); *Y02T 10/7011* (2013.01); *Y10T 29/4911* (2015.01)

(56) References Cited

U.S. PATENT DOCUMENTS

| | | | | |
|---|---|---|---|---|
| 6,136,287 | A * | 10/2000 | Horne et al. | 423/599 |
| 6,197,450 | B1 | 3/2001 | Nathan et al. | |
| 6,432,586 | B1 * | 8/2002 | Zhang | 429/251 |
| 6,818,347 | B1 * | 11/2004 | Jin et al. | 429/206 |
| 7,727,667 | B2 | 6/2010 | Sakurai | |
| 7,820,321 | B2 | 10/2010 | Horne et al. | |
| 2003/0215702 | A1 * | 11/2003 | Tanjou et al. | 429/127 |
| 2005/0221192 | A1 | 10/2005 | Hennige et al. | |
| 2007/0065728 | A1 * | 3/2007 | Zhang et al. | 429/326 |
| 2007/0092798 | A1 | 4/2007 | Spitler | |
| 2007/0134554 | A1 | 6/2007 | Armand et al. | |
| 2008/0006604 | A1 | 1/2008 | Keady | |
| 2008/0032197 | A1 * | 2/2008 | Horpel et al. | 429/224 |
| 2011/0003185 | A1 | 1/2011 | Kritzer | |
| 2011/0003197 | A1 | 1/2011 | Kritzer et al. | |

FOREIGN PATENT DOCUMENTS

| | | |
|---|---|---|
| EP | 1 577 966 | 9/2005 |
| EP | 2 284 425 | 2/2011 |
| JP | H09-213307 | 8/1997 |
| WO | WO 2004/021475 A1 | 3/2004 |
| WO | WO 2006/010894 A1 | 2/2006 |
| WO | WO 2006/045339 A2 | 5/2006 |
| WO | WO 2006/124663 A2 | 11/2006 |
| WO | WO 2008/153749 | 12/2008 |
| WO | WO 2010/005954 | 1/2010 |
| WO | WO 2010/028692 | 3/2010 |

* cited by examiner

US 9,437,855 B2

LITHIUM ACCUMULATOR AND THE METHOD OF PRODUCING THEREOF

CROSS REFERENCE TO RELATED APPLICATIONS

This application is the National Stage of PCT/CZ2009/000112 filed on Sep. 18, 2009, which claims priority under 35 U.S.C. §119 of Czech Republic Application No. PV 2008-572 filed on Sep. 19, 2008, the disclosure of which is incorporated by reference. The international application under PCT article 21 (2) was published in English.

FIELD OF THE INVENTION

The invention relates to a lithium accumulator including at least two three-dimensional electrodes separated by a separator and encased together with an electrolyte, comprising a non-aqueous solution of a lithium salt in an organic polar solvent, into an accumulator body. Further, the invention relates to a method of producing lithium accumulator with a specific type of three dimensional electrodes.

BACKGROUND OF THE INVENTION

The lithium cells have been intensively developed during the recent two decades enabling thus existence of many portable devices. Nevertheless the growing demands for higher capacity and safety of lithium batteries do not always comply. This slows down progress of many applications, including the substitution of lead-acid accumulators with lithium accumulators possessing higher voltage, or development of large batteries for electro mobiles and energy storage.

The prior art technologies using graphite as an active material for the negative electrode are not able to ensure safety of a battery with the weight exceeding 0.5-1 kg. The efforts to increase the size of this type of accumulators encounter many problems such as overheating, intermediate layer on the graphite, swelling, development of metal lithium on the graphite surface and a risk of explosion or fire. These safety problems push the large lithium accumulators beyond the limits of acceptability.

Technologies substituting graphite with a different material, e.g. lithium titanate spinel $Li_4Ti_5O_{12}$ (LTS) strongly improve the safety parameters of lithium batteries, but on the other hand, they significantly decrease the cell voltage.

The lithium batteries manufactured on this basis meet the safety demands for use in electro mobiles, but the weight parameters of such batteries don't allow their easy use in small vehicles.

All rechargeable lithium accumulators manufactured today are based on planar electrodes, where a mixture of an active material, conductive carbon and organic binding agent are laminated in a thin layer onto a conductive foil, usually aluminum or copper (current collector). The thickness of these planar electrodes usually does not exceed 200 micrometers. The positive and negative electrodes are stacked together separated by a thin layer of an electrically insulating material, usually a perforated foil made of an organic polymer—separator. The stacked thin-film electrodes insulated by the separators are then pressed together, placed into the accumulator package and the space inside the accumulator is filled with an electrolyte. A non-aqueous solution of lithium salts is used as an electrolyte. In connection with such devices based on the planar electrodes, it is most important to prevent the growth of lithium metal during the charging and discharging process e.g. when the charging or discharging is too fast. The lithium metal develops on electrodes in the form of dendrites, which overgrow through the separator and cause an electric shortage between both electrodes. Any use of metal lithium as a negative electrode in the planar thin-film configuration accumulator is impossible for the same reason.

One type of a cell with thin-film planar electrodes is described in detail in U.S. Pat. No. 6,197,450. Despite its increased volumetric capacity, this type is affected by inherent properties of planar electrodes as described above.

One of possible compositions of a lithium battery with a thin-film planar electrode configuration is described in US. pat. application 2007/0092798. Active nano-materials are used as a component of the electrodes. The battery cell arranged in planar configuration shows a relative low volumetric capacity, which is further limited by the type of cathode material.

Another US pat. application 2007/0134554 teaches a carbon electron conductor deposited on solid particles of a specific active material. The carbon improving the conductivity of the active material is to be formed directly on the surface of the active material using a rather complicated process of pyrolysis.

EP1244168A discloses the formation of thin layers of an electrochemical cell by coating a suitable substrate with a paste comprising the active material, organic binders and conductive carbon without application of a sintering process. The calculation of a model example 8, where a separator of 50-90% porosity is used, shows a gradient of the electrode's voltage with the electrical potential sharply dropping down with the increasing thickness of the electrode. Based on this fact, it is to be understood that the disclosed network can not be used for the formation of electrodes of higher thickness, for example exceeding 0.5 mm.

SUMMARY OF THE INVENTION

It is a primary object of the invention to provide a lithium accumulator with extended energy storage capacity and thickness of individual accumulator components, which can operate in a wide electric potential range.

Another object of the invention is to achieve the highest voltage of the accumulator and a considerable increase of the energy density.

Still another object of the invention is to provide an accumulator that may be used not only for high capacity button batteries and micro-electric mechanic systems but also as a high energy density accumulator designed for car industry, energy storage, etc.

Further object of the invention is to provide a simple low-cost accumulator manufacturing process.

The objects of the present invention can be achieved and the described deficiencies overcame by a lithium accumulator including at least two three-dimensional electrodes separated by a separator and encased together with an electrolyte, comprising a non-aqueous solution of a lithium salt in an organic polar solvent, into an accumulator body characterized by that the two electrodes have a minimum thickness of 0.5 mm each, of which at least one electrode comprises a homogenous, compressed mixture of an electron conductive component and an active material, capable to absorb and extract lithium in the presence of electrolyte, wherein the porosity of the pressed electrodes is 25 to 90%, the active material has morphology of hollow spheres with a wall thickness of maximum 10 micrometers, or morphology of aggregates or agglomerates of maximum 30 micrometers in size, while the separator consists of a highly porous electrically insulating ceramic material with open pores and porosity from 30 to 95%.

Hereinafter, other advantageous embodiments of the invention including modifications, specific details and the method of production of the lithium accumulator are described.

The electron conductive component, the active material and the separator are inorganic materials free of organic binders. This feature of the invention is based on a new knowledge discovered in the course of making this invention that any presence of organic binders in said components adversary affects the diffusion of lithium ions within layers of thickness exceeding several micrometers. Advantageous manufacturing by pressing creates accumulators that do not require any organic binders of any kind and are vibration resistant.

The electron conductive component may be selected from a group consisting of a conductive carbon and its modifications, conductive metals and electrically conductive oxides.

Usually, but without limitations, the active material can be selected from the group consisting of mixed oxides or phosphates of lithium, manganese, chrome, vanadium, titanium, cobalt, aluminum, nickel, iron, lanthanum, niobium, boron, cerium, tantalum, tin, magnesium, yttrium and zirconium.

In a thin-film electrode, the particles of the active material have, within the scope of their usable capacity, the ability to completely absorb and extract lithium ions in the time interval of up to 20 minutes.

The active material preferably consists of nanoparticles of doped and undoped spinels of lithium manganese oxide or lithium titanium oxide sized up to 250 nm.

The positive electrode comprises 40-85 wt % of the active material and optionally a current collector in the form of expanded foil, net, grid, wire, fibers or powder.

The current collector is selected from a group consisting of aluminum, copper, silver, titanium, silicon, platinum, carbon or a material stable within the voltage window of the particular cell.

The electrode consists of a compressed, homogenous mixture of an active material, electron conductive component and a current collector.

The separator is a bulk layer or sheet of a highly porous powder of a ceramic material, advantageously based on $Al_2O_3$ or $ZrO_2$.

Preferably, the separator may have a non-directional morphology of a pyrolyzed product or nonwoven glass or ceramic fibers with an open type of porosity, and may be made by compressing the powder of a pyrolyzed product or ceramic nonwoven fibers into a bulk layer. The thickness of the separator is ranging from 0.1 mm to 10 mm and the separator can be created by compressing the powder directly onto the electrode, or it can be separately pressed into a sheet, often a tablet, optionally thermally treated, and then placed onto the electrode.

Both these morphologies of the fully inorganic separator, together with its thickness, which is many times higher compared to the separators of the previous art, enable the use of lithium metal as a negative electrode. This extends the voltage and the energy storage capacity of the lithium accumulator up to the theoretical possibilities.

The negative electrode preferably consists of lithium metal, which may be in the form of a lithium sheet or a foil, or a combination of a compressed lithium sheet or foil and dendrites, or preferably lithium dendrites as such. The dendritic form of lithium may be made "in situ" from the lithium foil or sheet by cycling of the lithium accumulator.

Moreover, the size of dendrites and their surface can be modified by addition of another compound, e.g. conductive carbon, or by the electrolyte composition, or by mixing certain substances into the electrolyte, e.g. stable phosphates.

The use of metal lithium, advantageously in its dendritic form, strongly reduces the weight and size of the lithium accumulator and in the embodiments described herein; this form simultaneously increases the accumulator safety in comparison with those containing graphite. To this effect, the combination of lithium metal dendrites with the above described organic free separator is used. The separator prevents lithium dendrites from penetrating through it, so the dendrites may be used as a negative electrode. Moreover, said combination provides for a high safety of the accumulator in the event of short-circuit.

The electrolyte lithium salt is preferably selected from the group consisting of $LiPF_6$, $LiPF_4(CF_3)_2$, $LiPF_4(CF_4SO_2)_2$, $LiPF_4(C_2F_5)_2$, $LiPF_4(C_2F_5SO_2)_2$, $LiN(CF_3SO_2)_2$, $LiN(C_2F_6SO_2)_2$, $LiCF_3SO_3$, $LiC(CF_3SO_2)_3$, $LiBF_4$, $LiBF_2(CF_3)_2$, $LiBF_2(C_2F_5)_2$, $LiBF_2(CF_3SO_2)_2$, $LiBF_2(C_2F_5SO_2)_2$ and $LiClO_4$. The electrolyte may further contain modification agents improving accumulator functions at high temperatures and/or removing decomposition products and/or protecting the accumulator from overcharging and/or substances controlling the size of metal lithium dendrites.

According to one embodiment of the invention, the lithium accumulator comprises a hollow body having an upper opened part and a lower part to form a first pole of the accumulator, a first electrode situated in the lower part of the body and being in electrical contact with an internal surface of the body, a second electrode in the upper part separated from the internal surface of the body by an insulating insert, a separator placed between the first electrode and the second electrode, a cap closing the upper opened part and being in electrical contact with the second electrode to form a second pole of the accumulator, a sealing cover for insulating the cap from the body.

According to another embodiment, the lithium accumulator comprises an upper body and a lower body joined together both defining an internal accumulator space and connected to the first pole of the accumulator, a first electrode pressed into the internal space of the bodies to form a central cavity inside and being in electrical contact with the bodies, a second electrode located inside the central cavity, the second pole of the accumulator being in electrical contact with the second electrode and extending outside the accumulator body and separators dividing the first electrode from the second electrode.

According to still another embodiment, the lithium accumulator comprises an upper body including the first accumulator pole and a lower body including the second accumulator pole, both bodies assembled together defining an internal accumulator space volume, a first electrode located within the internal space of the upper body, a second electrode located within the internal space of the lower body, a separator dividing the first electrode from the second electrode and a seal disposed between the upper body and the lower body for electrical insulation of the first accumulator pole from the second accumulator pole.

According to still further embodiment the lithium accumulator includes two marginal sets and at least one internal set each of said sets comprising first electrodes, second electrodes, separators, current collectors and accumulator poles, further comprising: a hollow marginal upper body having an closed external surface and an opened internal surface to define a marginal frame for receiving a first electrode, a hollow marginal lower body having an closed external surface and an opened internal surface to define a marginal frame for receiving a first electrode, internal frames for receiving first electrodes, internal frames for receiving second electrodes, separators disposed between the adjacent first electrodes and second electrodes, current collectors for providing electrical contact with the first electrodes and connected to the first accumulator pole, current collectors for providing electrical contact with the second electrodes and connected to the second accumulator pole, at least one internal set of the same configuration as the marginal sets wherein the marginal bodies are replaced by the internal frames.

According to one method of production of the lithium accumulator, at least one bulk sheet of a first electrode, a separator and at least one sheet of a second electrode are stacked by pressing upon each other, the accumulator body is filled with an electrolyte, closed up and the current collectors of the same type of electrodes are connected.

Alternatively, the individual sheets may be gradually pressed one upon the other by an impact.

In another alternative, the compressed sheets of at least one electrode, a separator and at least one another second electrode are alternatively stacked on top of each other, the accumulator body is filled with the electrolyte, closed up and the current collectors of the same type of electrodes are connected.

As to the chemical composition it is possible to use only active materials with a fast lithium ion electro-diffusion for this type of lithium cells (absorbing and extracting lithium very fast). The optimal are spinel structures, which can absorb and extract lithium fast in all crystalline orientations. It is possible to conveniently use doped or undoped spinels of lithium manganese oxide $LiMn_2O_4$ (LMS), $LiMn_{1.5}Ni_{0.5}O_4$ (LNMS) or lithium titanium oxide $Li_4Ti_5O_{12}$ (LTS).

The morphology of the active materials in the powder form, capable to absorb and extract lithium fast, plays an important role and must meet several basic parameters. The optimum particle size of active materials may vary, but it must fulfill the ability of complete charge and discharge (absorption and extraction of lithium ions) of the particles within 20 minutes. The optimal are particles of the active materials, which can be completely charged and discharged in less than 1 minute, preferably in several seconds. Advantageously, nano sized crystals of the spinel structures may be used. Lithium titanium oxide with the spinel structure and particles size 200-250 nm can be charged or discharged during 30 minutes, but the same material with the particles size 30-50 nm can be charged or discharged in the time period up to 30 seconds. The lithium manganese oxide spinel with the particles size of 150 nm can be charged or discharged in 1 minute.

In the optimum case, the active nano-crystalline materials have morphology of hollow spheres with the wall thickness up to 10 micrometers, preferably from 1 to 3 micrometers. This morphology can be conveniently prepared by spray-drying of the active material suspensions. The diameter of these hollow spheres is preferably from 1 to 50 micrometers.

When using compact aggregates or agglomerates of the active material, which are made for example by grinding a dry material, the size of these formations must be less than 30 micrometers, and favorably less than 5 micrometers.

The thickness and capacity of the individual electrodes of the lithium accumulator according to the invention is at least 5 times, and commonly two orders of magnitude higher than the thickness of electrodes used in the lithium cells with the thin-film planar configuration. Consequently, the lithium accumulator according to the invention enables to achieving up to 5 times higher voltage than the lead accumulator, while keeping the same capacity and size.

The metal accumulator body of the disclosed construction enables easy cooling and heating of the accumulator. If a negative lithium electrode is used instead of the commonly used graphite electrode, it is possible to charge the accumulator faster with a higher electrical potential difference. The lithium accumulator according to the invention may be charged and discharged in the time interval of 1-24 hours, while 50% of the cell capacity can be typically discharged in less than 2 hours. It is possible to charge and discharge the lithium accumulator 100 times and more, while preserving 80% of its capacity. The use of the metal lithium in the form of dendrites significantly increases the current density compared to a compact lithium foil.

In the process of manufacture, the active material is homogenously mixed with the highly electron conductive component, for example conductive carbon. The ratio of the active material to the conductive carbon differs with the individual chemical compositions. The mixture usually contains 40-85 wt % of the active material. Most frequently, the content of the conductive carbon is 25-40 wt %. This mixture does not contain any organic binding agents such as polyvinylidene fluoride (PVDF) or others. The obtained mixture is compressed into a sheet 0.5-50 mm thick. The sheets of the separator and the second electrode are gradually pressed onto the sheet of the first electrode; the accumulator is filled with an electrolyte and closed up. The separator to be incorporated into the accumulator may have an initial structure of a powder which may be pressed down directly onto the electrode or it can be a compact block of a separately compressed powder to obtain a tablet in a shape fitting the respective shape of the electrode, and may be further subjected to a heat treatment. The thickness of the separator is ranging from several tenths of micrometers to several millimeters.

If larger blocks of electrodes with higher capacity are manufactured, it is possible to add a current collector to the mixture of the electron conductive component and the active material e.g. wire, metal sawdust, fibers, grid or net in order to carry high currents, and press them together into a compact block of the electrode in the way that the current collector is connected to the pole of the electrode. The pole of the electrode, electrically connected to a peripheral wire, is usually the electrode casing, made of aluminum or another conductive material. Aluminum, copper, silver, titanium, gold, platinum, silicon or other conductive metals, which are stable in the applicable voltage range, may be used as this current collector material. It is also possible to use carbon fibers and nanotubes. The mixture is pressed together, pertinently with an impact into a sheet or block up to several centimeters thick. The porosity of an electrode prepared in this way varies from 25 up to 80%, typically from 30 to 50%.

A multi-electrode lithium accumulator with a high energy storage capacity may be advantageously produced by pressing individual sheets of electrodes and separators repeatedly on the top of each other and connecting the poles of the same type of electrode i.e. by repeating the configuration of a positive electrode three-dimensional block separated by a separator from lithium or a three-dimensional block of the negative electrode and by electrical connecting of the respective electrodes together.

The production of the accumulator cell by pressing the individual components from powders is straightforward and inexpensive. These methods also guarantee an excellent resistance against shaking and vibrations, to which the accumulators may be exposed during the operation.

The lithium accumulator according to the invention is designed for the use as a high capacity button cell accumulator or for a high voltage accumulators used in the car industry or as an energy storage medium.

DESCRIPTION OF PREFERRED EMBODIMENTS

Reference is now made in details to the embodiments of the present invention, examples of which are illustrated in the accompanying drawings and in specific examples of these embodiments wherein like reference numbers refer to the like elements throughout. The following examples illustrate but do not limit the present invention. It is to be understood that where a term three-dimensional (3D) is used throughout the specification in relation to electrodes, this term shall refer to the electrode thickness greater than 0.5 mm

EXAMPLE 1

Figure 1:
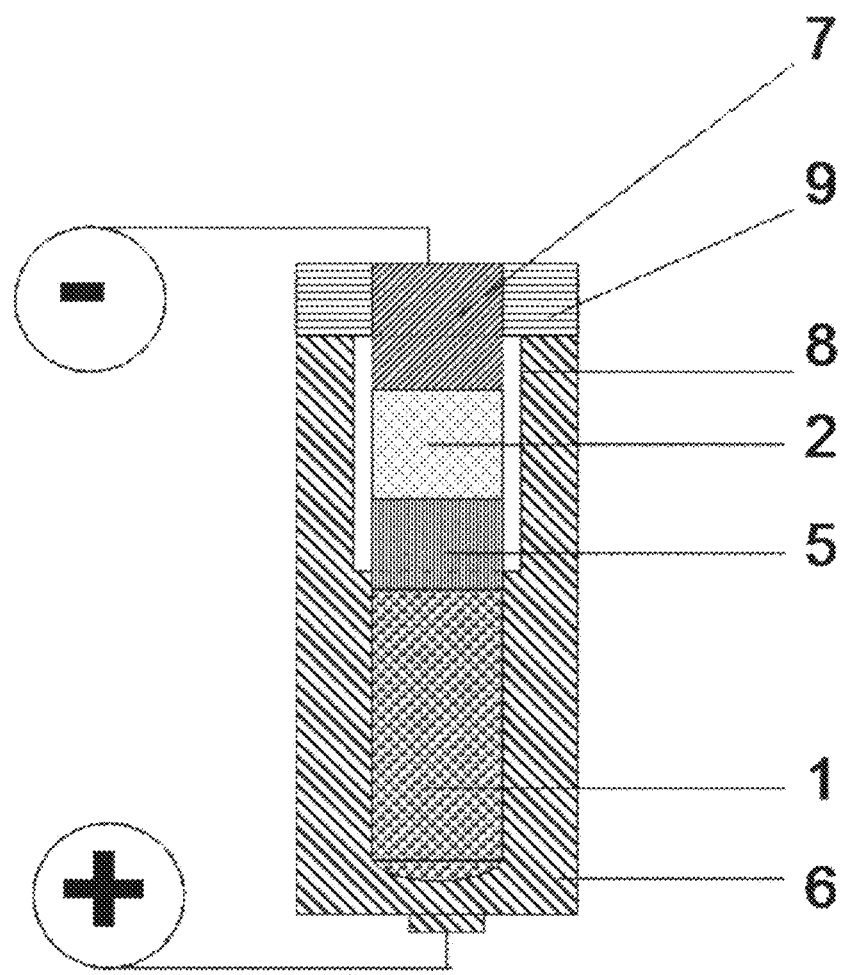
FIG. 1 is a schematic sectional view of one embodiment of a lithium accumulator.

FIG. 1 shows one of possible embodiments of a lithium accumulator, based on three-dimensional electrodes, consisting of a hollow body 6 with an opened upper part and a lower part. The lower part if filled up with the material of a first (positive electrode) 1, while in the upper part a second electrode 2 as a negative electrode is located. A separator 5 is placed above the first electrode 1 to separate it from the second electrode 2. The first electrode 1 is in electrical contact with the body 6 which is the positive pole of the accumulator. The second electrode 2 is electrically separated from the body 6 by an insulating filler 8 made of corundum. In the upper part, the internal space of the body 6 is hermetically sealed by an electrically conducting cap 7 made of copper, and a sealing cover 9 made of plastics. The cap 7 is in electrical contact with the second electrode 2 and represents the negative pole of the accumulator. The whole internal space of the accumulator body 6 is filled with an electrolyte and hermetically closed.

Figure 2A:
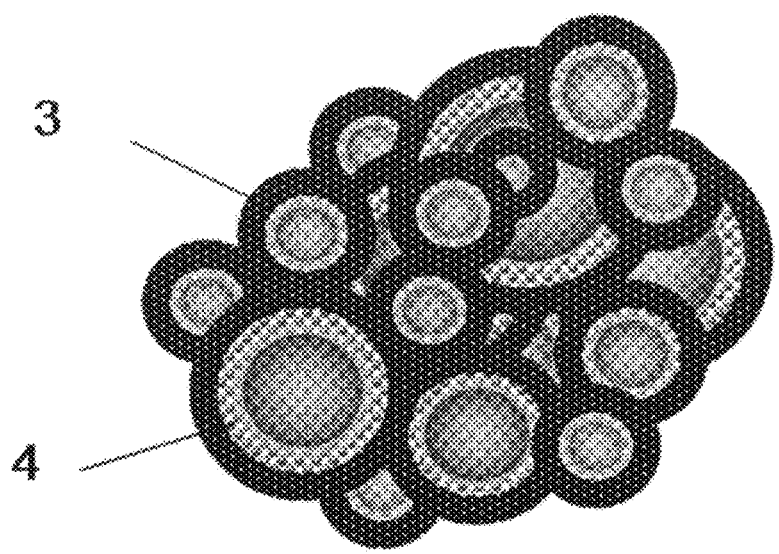
FIG. 2a is a schematic view of the powder mixture.
Figure 2B:
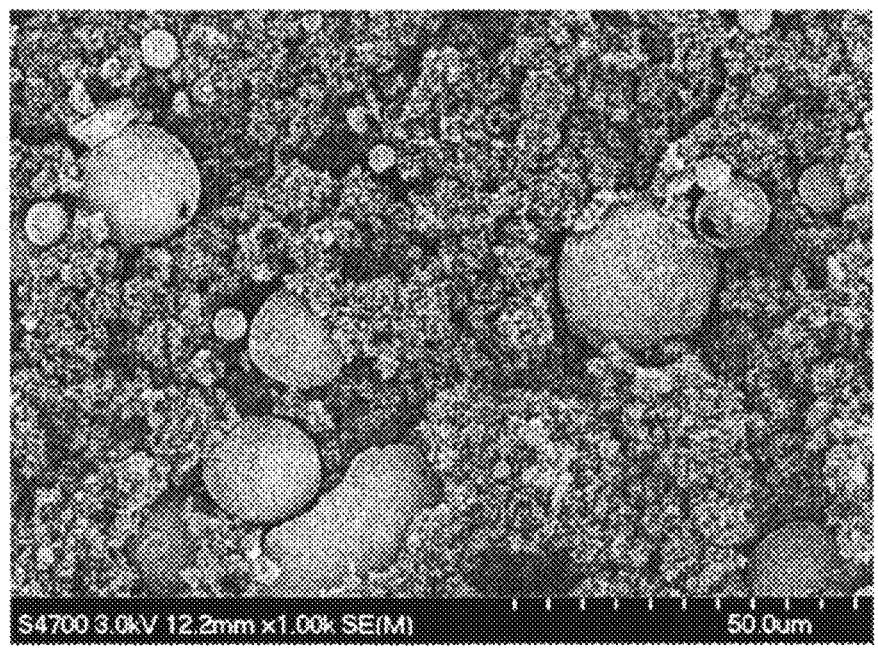
FIG. 2b is a scanning electron microscope micrograph showing the optimal morphology of a powder mixture of the active material and the conductive carbon for a three-dimensional electrode.

Hereinafter, the composition of individual components of the accumulator, including the methods of their preparation is described in detail. The schematic drawing in FIG. 2a shows a mixture of powders of the active material 4, i.e. nano-crystals of lithium titanium oxide $Li_4Ti_5O_{12}$ (nano-LTS) and an electron conductive component 3. The morphology of the mixture is shown by a SEM photograph in FIG. 2b. The active material was prepared by drying a suspension of nano-LTS crystals in a spray drier. The powder was homogenously mixed with a conductive component 3 i.e. highly conductive carbon, manufactured by Timcal and distributed under a product name Super P Li, in a ratio 65 wt % of nano-LTS crystals to 35 wt % of the conductive carbon. The fully inorganic mixture, free of any organic binders, was pressed down into the body 6 to form a tablet of the first electrode 1. The thickness of the first electrode 1 (LTS electrode) was 4 mm and its overall porosity 40%. The average size of the active material particles was 50 nm and the ability of the particles to absorb and extract lithium ions in a thin layer during the complete charging and discharging period was below 1 minute. The separator 5 was made of highly porous corundum powder, free of any organic binders, by pressing the powder down directly onto the LTS electrode. The compressed separator was 2 mm thick and its porosity was 85%. In another method, the separator of the same composition was applied in the form of a separately compressed block, placed onto the electrode.

Figure 3:
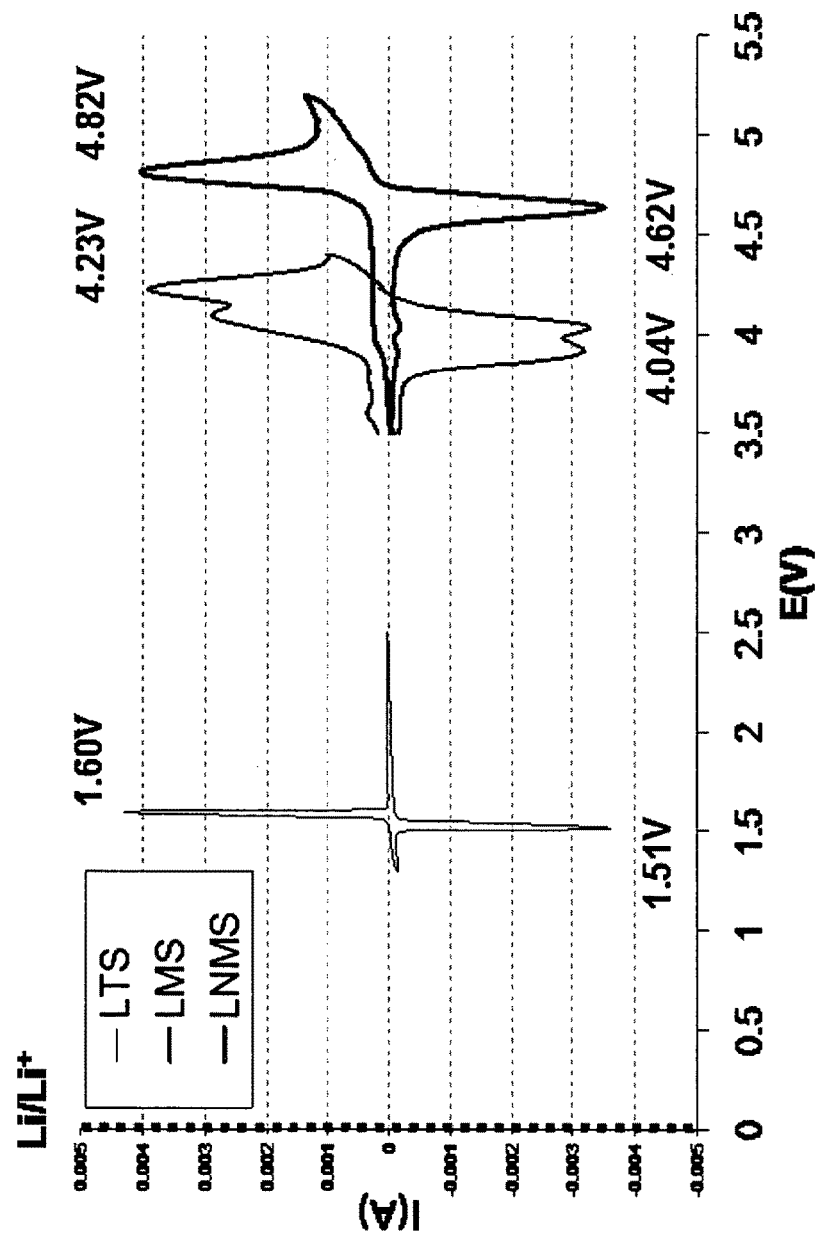
FIG. 3 is a graph with voltamograms showing the characteristic potentials of active materials $Li_4Ti_5O_{12}$ (LTS), $LiMn_2O_4$ (LMS), a $LiMn_{0.5}Ni_{0.5}O_4$ (LMNS) against lithium.

A pure lithium metal sheet, was used as the second electrode 2, pressed down with the copper cap 7 onto the separator 5 into the space electrically separated from the body 6 by a corundum insulating filler 8 and a plastic sealing cover 9. After soaking up the accumulator with the electrolyte 1M $LiPF_6$ in EC-DMC (ethylene carbonate-dimethyl carbonate) overnight, the accumulator was hermetically closed and cycled several times so that the lithium dendrites could be formed expanding the active surface of the negative electrode 2. After achieving the full capacity of the accumulator during a slow charging cycle (lithiation of the active LTS material), the accumulator was discharged at an applied bias of 1.5 V above the formal voltage of the accumulator (3 V against Li/Li$^+$). The voltammogram of the above described combination is shown in FIG. 3 together with the formal electrical potentials of two other active materials used in the following examples.

Figure 4:
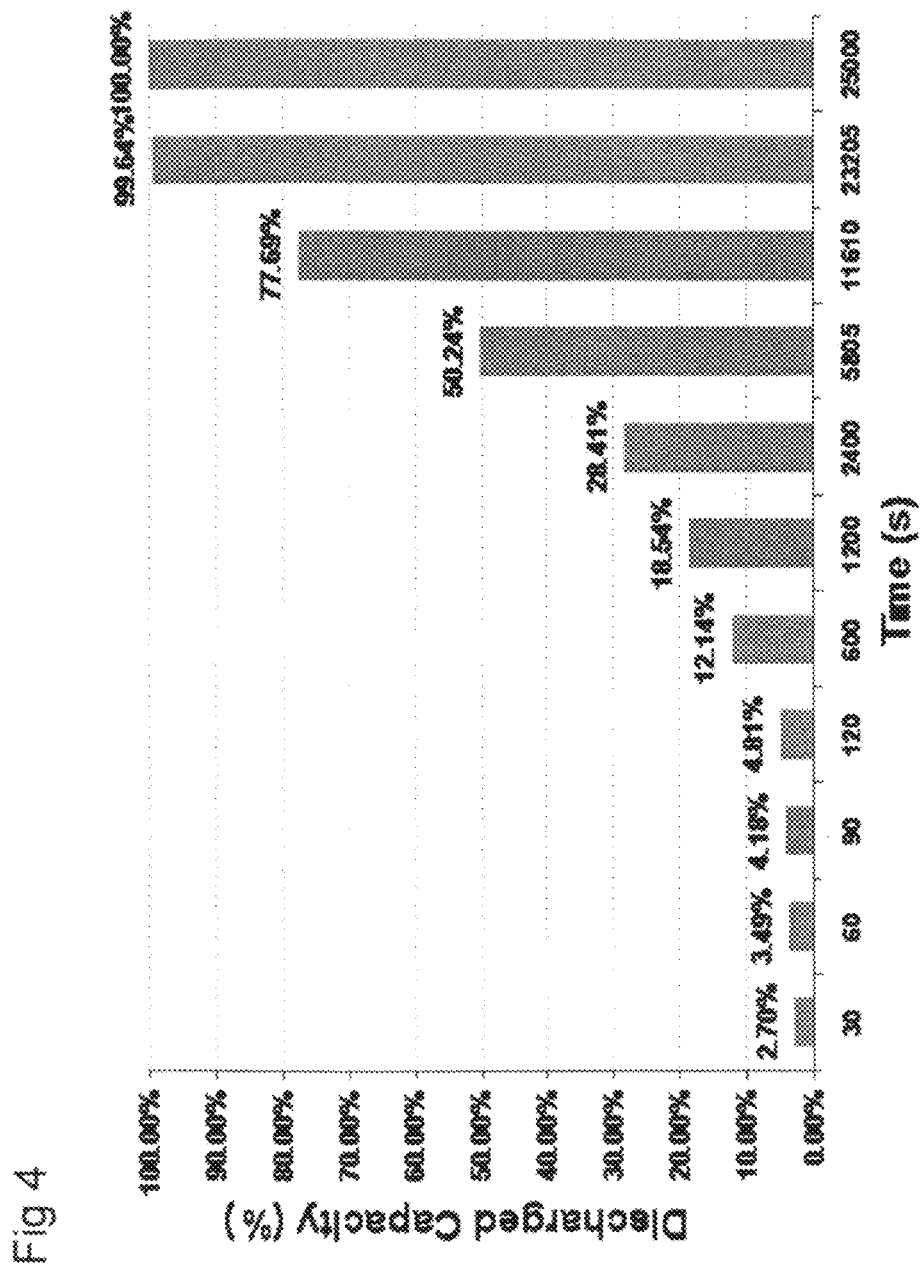
FIG. 4 is a graph showing the characteristics of Li/LTS accumulator (1.5 V) discharging cycle at the constant bias of 3 V.

The characteristic discharging cycle is shown in FIG. 4. The reversible capacity of this accumulator was almost 100 mAh/cm$^3$. It took 7 hours to achieve the full capacity. Charging currents were improving during cycling due to the increase of the lithium concentration in the electrolyte inside the compressed positive LTS electrode 1 and due to the creation of Li dendrites on the negative lithium electrode 2. The discharging cycle was regularly slowing down, when roughly 80% of the theoretical capacity of the accumulator was achieved.

The accumulator may be completely charged and discharged during several hours. Typically, it is possible to repeatedly charge and discharge the complete capacity of the accumulator during 3 to 24 hours. Most frequently, 50% of the capacity is reproducibly and repeatedly charged and discharged within two hours and cycling of this lithium accumulator type exceeds 100 charging and discharging cycles. The lithium electrode allows using of higher bias during charging compared to a graphite electrode.

EXAMPLE 2

Figure 5:
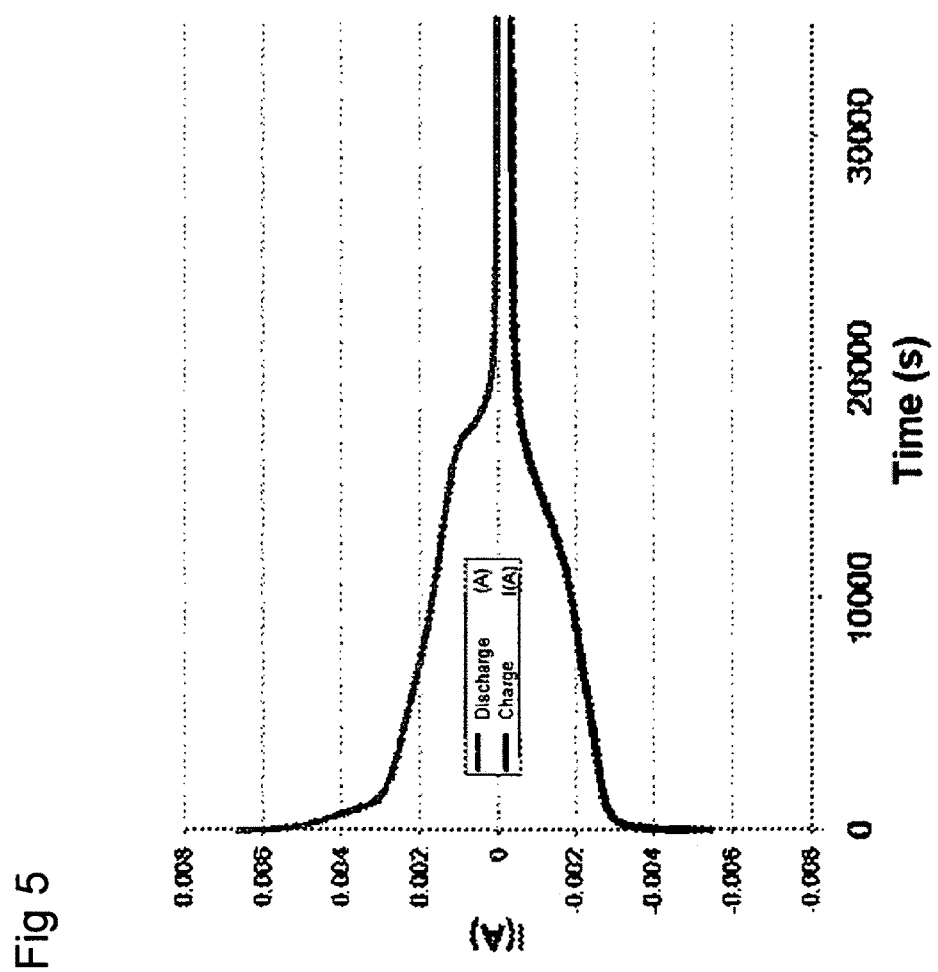
FIG. 5 is a graph showing the current characteristics of Li/LTS accumulator (1.5 V) during charging and discharging measurements, described in example 2.
Figure 6:
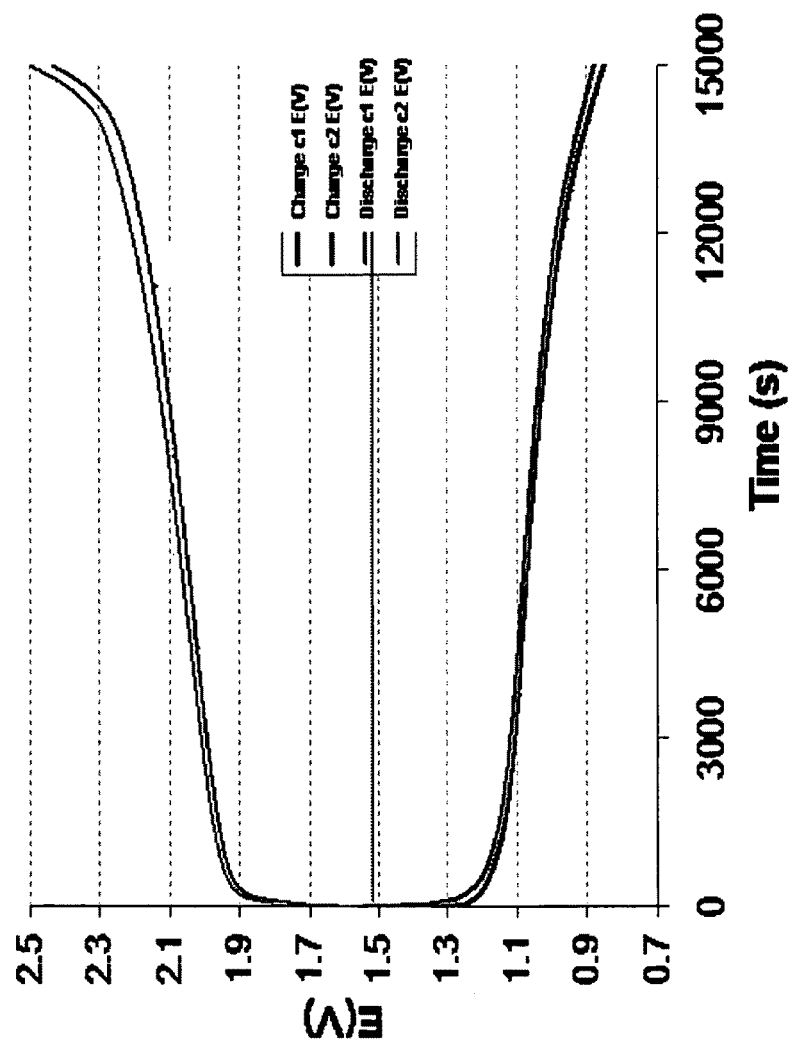
FIG. 6 is a graph showing the voltage characteristic of Li/LTS accumulator (1.5 V) during charging and discharging measurements, described in example 2.

A lithium accumulator of FIG. 1 was composed of compressed lithium dendrites as a negative electrode, and a 2.5 mm thick positive electrode prepared by pressing the mixture of LTS active material with an electron conductive component—conductive carbon, described in example 1. The separator was made of $ZrO_2$ inorganic fibers with the porosity of 70%. It was less than one millimeter thick. The accumulator was then cycled five times to achieve the full capacity of the charging cycle. The theoretical capacity of the accumulator was 12 mAh. Afterwards, the current and voltage characteristics of accumulator were measured during following cycles. FIG. 5 shows the current characteristics during the controlled charging and discharging with the applied bias of 1 V above and bellow the formal potential of the Li/LTS accumulator, which is 1.5 V. The reversible process in both directions ended practically after twenty thousands of seconds (5.5 hours). FIG. 6 shows the stable voltage course of both cycles up to approximately 80% of the theoretical capacity during the galvanostatic charging and discharging with the constant current of 2 mA.

EXAMPLE 3

Figure 7:
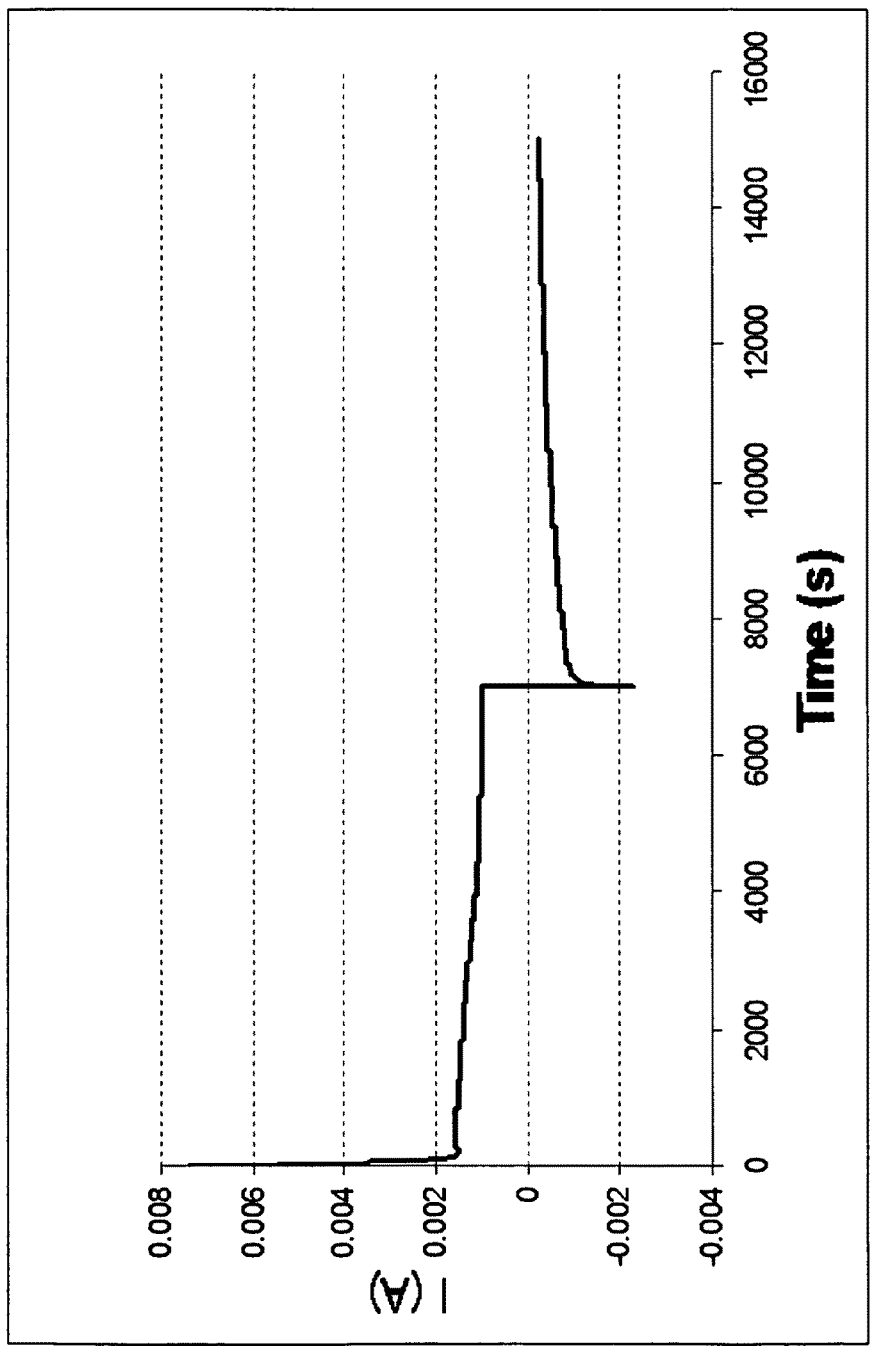
FIG. 7 is a graph showing the current characteristic of LTS/LNMS accumulator (3 V) during charging and discharging measurements, described in example 3.

The negative electrode of a lithium accumulator in FIG. 1 was made by pressing a mixture of 30 wt % of the conductive carbon with 70 wt % of the $Li_4Ti_5O_{12}$ active material (LTS) having the original morphology of hollow spheres. The average size of LTS particles was 50 nm. The positive electrode was a compressed mixture of $LiMn_{1.5}Ni_{0.5}O_4$ active material (LNMS) consisting of agglomerates, smaller than 5 micrometers with the average size of primary particles around 100 nm, and 30 wt % of the conductive carbon. The mixture was compressed together with an aluminum wire as a current collector. LNMS active material was used in excess of 30 wt % creating a 4 mm thick positive electrode. Both electrodes were divided by a 0.5 mm thick separator made of compressed corundum with the porosity of 80%. The accumulator was filled with the electrolyte $1MLiPF_6$+EC-DMC. The formal potential of the accumulator was 3.1 V and it was tested in the voltage range from 2.0 to 3.5 V. The plot in FIG. 7 illustrates the current characteristic of one potentiostatic cycle with the charging and discharging voltage 3.5 V and 2 V respectively.

EXAMPLE 4

Figure 8:
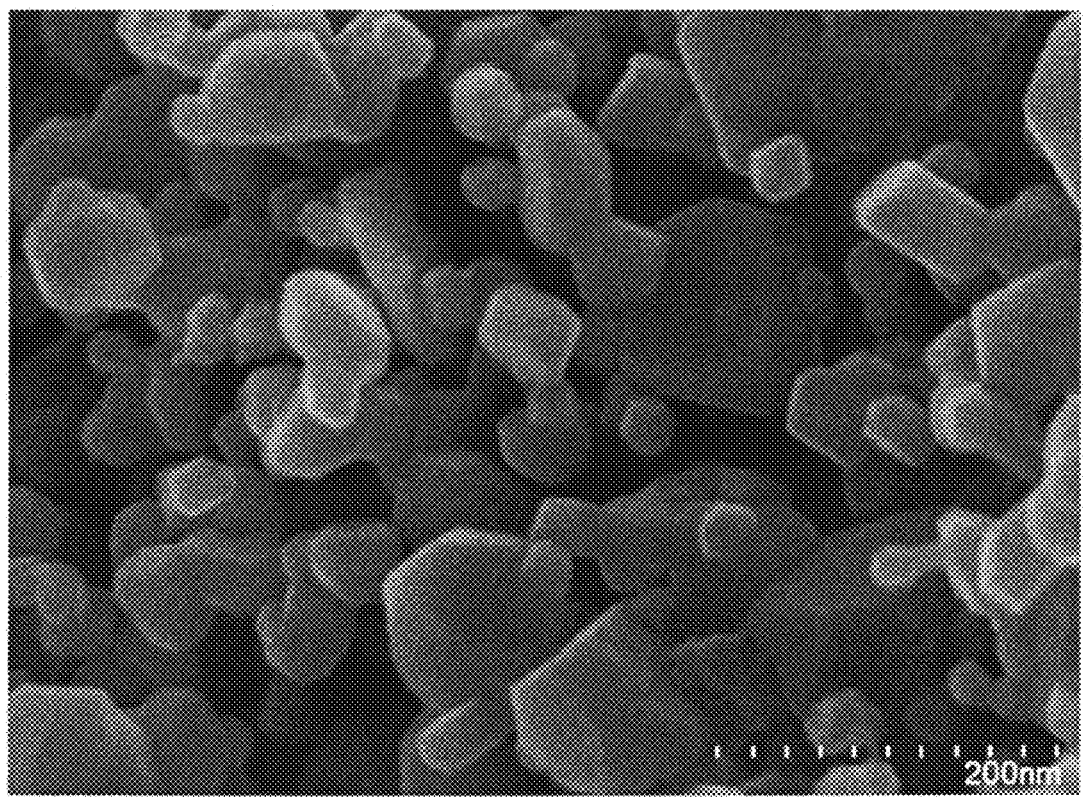
FIG. 8 shows a photograph of nano-particles of the active material $LiMn_2O_4$ (LMS), used in example 4, acquired by an electron microscope.
Figure 9:
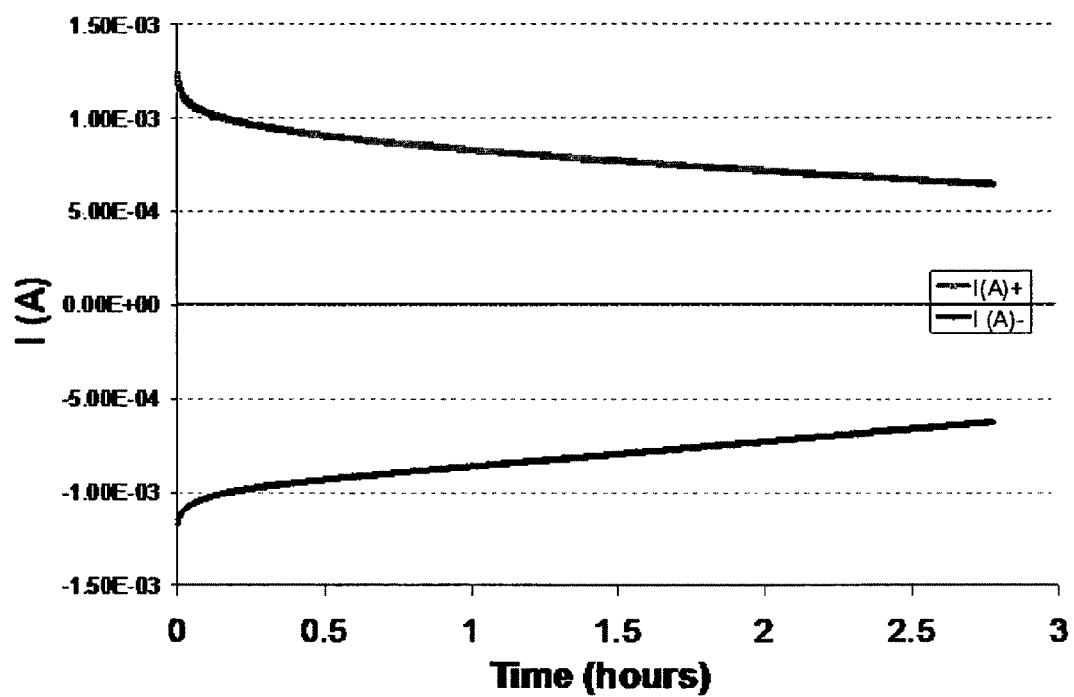
FIG. 9 is a graph showing the current characteristics of Li/LMS accumulator (4.3 V) during charging and discharging measurements, described in example 4.

In preparation of the lithium accumulator in FIG. 1, a mixture of 70 wt % of the $LiMn_2O_4$ active material (LMS) with the aggregate size distribution under 30 micrometers, shown in the SEM photography in FIG. 8, and 30 wt % of highly conductive carbon was compressed into a tablet of the first electrode 1. The obtained electrode 1 was over 1 mm thick, its overall porosity was 35% and the capacity was 7 mAh. The separator tablet made of porous corundum was 1.5 mm thick with 75% porosity. It was pressed directly onto the positive first $LiMn_2O_4$ (LMS) electrode 1. The sponge of lithium metal dendrites compressed on the surface of a lithium metal sheet was used as the second (negative) electrode 2. FIG. 9 shows the current characteristics of reversible charging and discharging of 40% of the Li/LMS accumulator capacity. It took less than 3 hours to reversibly charge and discharge 40% of the capacity at potentials 4.45 V and 3.9 V respectively.

The graph with voltamograms in FIG. 3 shows voltages of cells obtainable with the mentioned materials. It is apparent from the graph that it is possible to create a cell with the average voltage of 1.55 V from the combination of electrodes made of the lithium and $Li_4Ti_5O_{12}$ (LTS). Comparing lithium to (LMS), it is possible to create a cell with the voltage around 4.2 V, while if the nickel doped lithium manganese oxide $LiMn_{1.5}Ni_{0.5}O_4$ (LNMS) is used, the formal voltage of the created accumulator is 4.7 V. If two compounds, LTS and LNMS are combined, it is possible to create a cell with the voltage 3.02 V (4.62−1.60=3.02).

EXAMPLE 5

Figure 10:
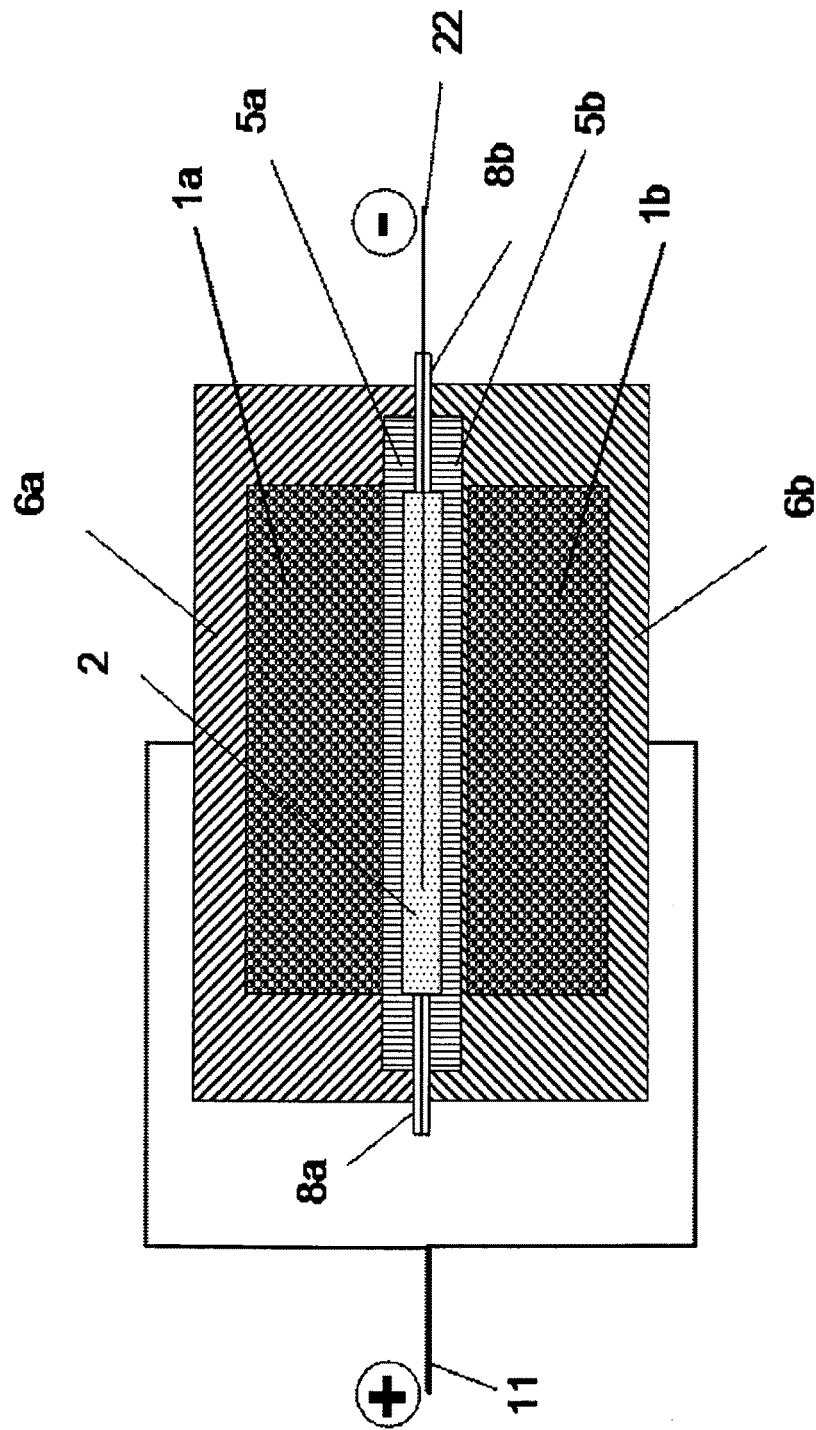
FIG. 10 is a schematic sectional view of another embodiment of a lithium accumulator.

FIG. 10 shows another possible embodiment of a lithium accumulator. The accumulator body made of aluminum consists of two similar hollow sections: an upper body 6a and a lower body 6b. The bodies 6a and 6b are joined together to form an internal hermetically sealed hollow space. A first electrode, as a positive electrode, consists of two similar positive electrodes 1a,1b each disposed along the internal surface of the bodies 6a, 6b so that the first electrode arranged in a "sandwich" constellation defines a central cavity, in which a separator consisting of two plates 5a, 5b is located. The plates 5a,5b are shaped to form an internal chamber in between, which is filled up with a material of a second (negative) electrode 2. The second electrode 2 is electrically insulated from the bodies 6a, 6b by a separator 5.

Two VITON seals made by DuPont, as insulating fillers 8a and 8b are placed between the accumulator bodies 6a and 6b hermetically closing the accumulator. The first pole 11 as a positive pole of the accumulator is connected to the outside surface of the bodies 6a, 6b, while the second (negative) pole 22 made of copper wire provided with Teflon insulation protrudes into the chamber of the second electrode 2, where it is in electric contact with lithium, and its other end extends outside the bodies 6a, 6b.

In the following details the preparation, composition and characteristic of the accumulator shown in FIG. 10 and the components thereof are described. The active $LiCo_{0.1}Mn_{1.9}O_4$ material (LCMS) with the specific surface of 10 m²/g and the hollow sphere morphology, was mixed with the highly conductive carbon (Super P Li manufactured by Timcal) in the ratio 60 wt % to 40 wt %. The mixture was pressed into the bodies (6a, 6b) forming two positive electrodes. The pressing force was 25 kN. One positive electrode contained 0.4 g of the mixture and the other 0.35 g. The electrodes were used together in the 'sandwich' assembly possessing the total capacity of 40 mAh. The positive electrodes in the aluminum bodies were 3 mm thick each with the surface area 0.64 cm², which gives total of 1.28 cm² in the "sandwich" constellation. Two highly porous alumina separators 5a, 5b were profiled to create a 1 mm high chamber for the lithium metal anode—the second electrode 2. They were prepared by pressing an alumina powder at 25 kN and a subsequent thermal treatment at 1050° C. for 2 hours. The thickness of each separator plate was around 0.8 mm and the porosity greater than 60%. The profiled separator plates were placed on the positive electrodes. The space between them was filled by a mixture of lithium dendrites with 5 wt % of Super P Li conductive carbon spread on a 0.3 mm Li metal foil.

The individual bare strands of the wire were pressed into the lithium foil and served as a current collector inside the Li metal negative electrode. The other end of the wire was the negative pole 22 of the accumulator. The accumulator positive pole 11 was an aluminum clamp connecting both bodies 6a, 6b of the positive electrodes. The dry accumulator was filled with the electrolyte 0.5 M $LiPF_6$ lithium salt in EC/PC/DMC (ethylene carbonate-propylene carbonate-dimethyl carbonate) solvents in the ratio 0.5/0.5/1.

Figure 11A:
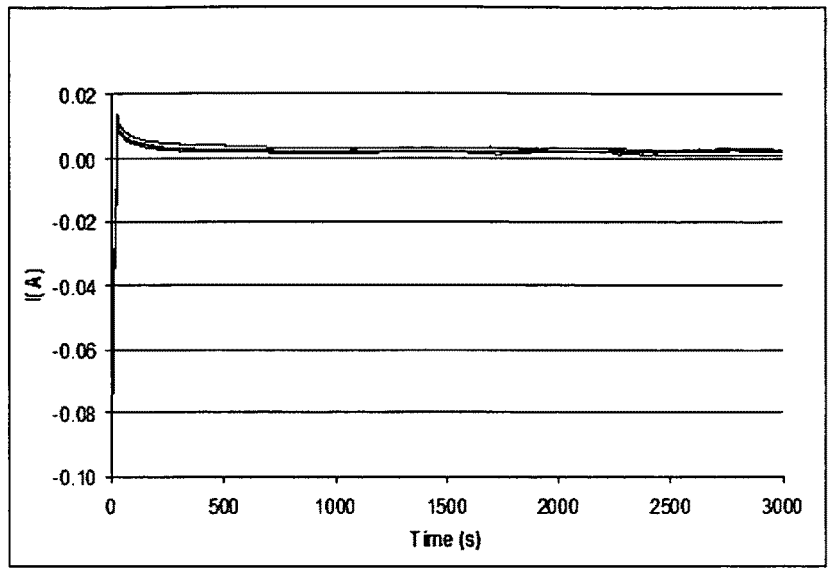
FIG. 11a shows pulse discharge and slow charge characteristics of an accumulator described in example 5.
Figure 11B:
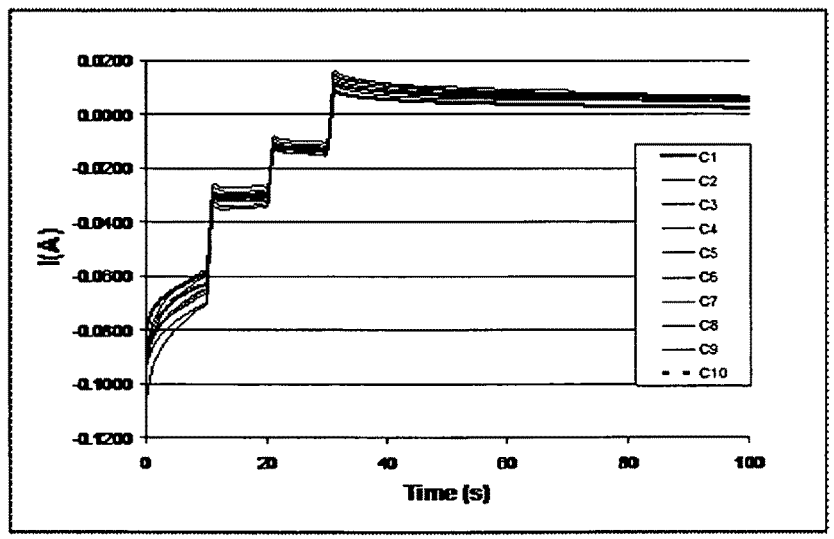
FIG. 11b shows a detail of the pulse discharge characteristics during the first 30 seconds and switching to the slow charge.

LCMS operates in the window around 4.2 V against lithium. Complete charge and discharge of the material occurred in less than 3 minutes, when measured as a 5 micrometers layer on a conductive glass substrate. The specific capacity of the particular material was determined as 90 mAh/g. The accumulator was continuously charged at 4.45 V for 7000 seconds to reach 60% of the theoretical capacity. Then the accumulator was exposed to ten-second discharge pulses at the controlled potentials of 2 V, 3 V and 3.6 V. After the 10-second discharge pulses the accumulator was slowly charged at 4.3 V for 3000 seconds and the procedure was repeated ten times (FIG. 11a). Details of the step-pulse controlled discharge are shown in FIG. 11b. During the 30 seconds 0.85-0.95% of the accumulator capacity was discharged.

Figure 12:
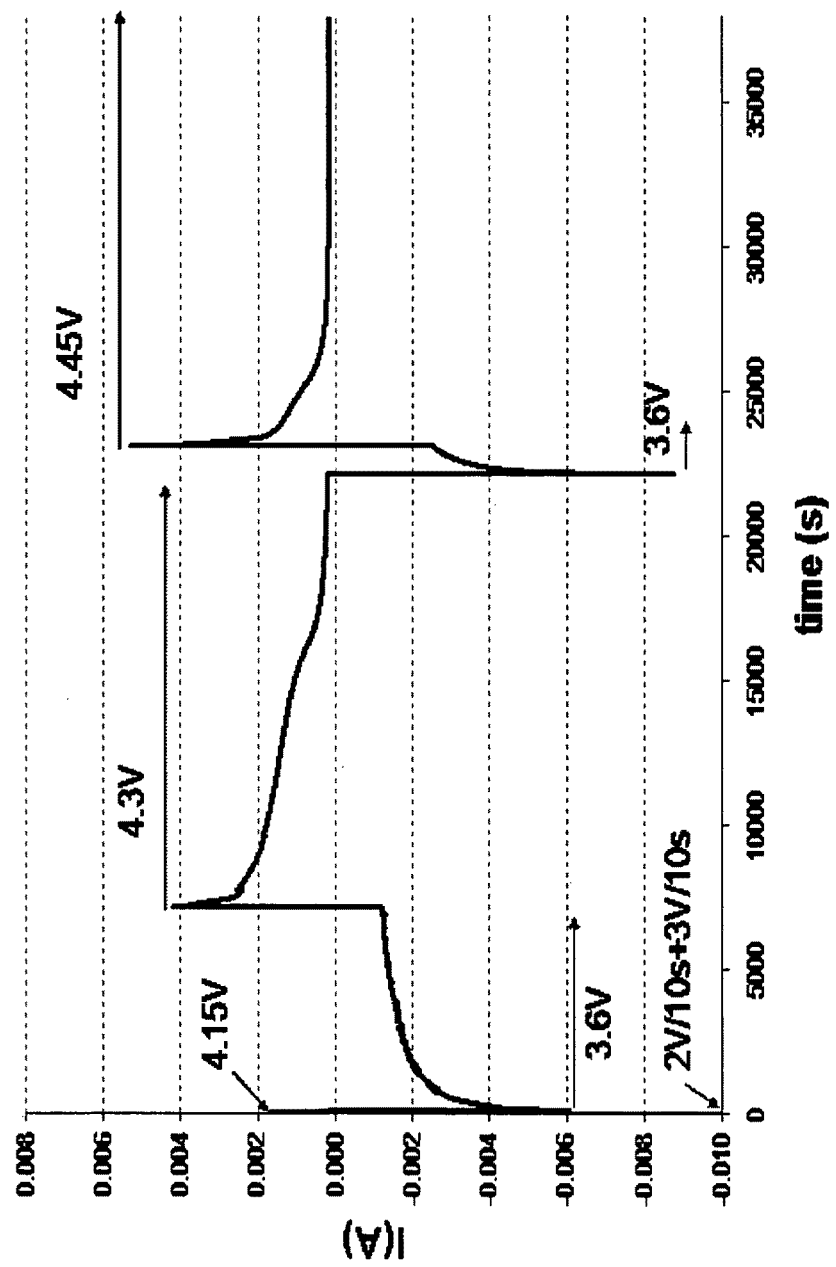
FIG. 12 shows charge and discharge characteristics of an accumulator described in example 5 at different applied biases.

Behavior of the accumulator, especially signs of a short circuit were further observed at 2V, 3 V and 3.6 V discharge and 4.15 V, 4.3 V and 4.45 V charge potentials (FIG. 12). The accumulator was taken apart and analyzed after 70 cycles. The separator showed no sign of penetration of the lithium dendrites under the surface. The lithium foil partially converted into a dense black aggregated sponge consisting of Li dendrites. The dendrites held mechanically well together.

EXAMPLE 6

Figure 13:
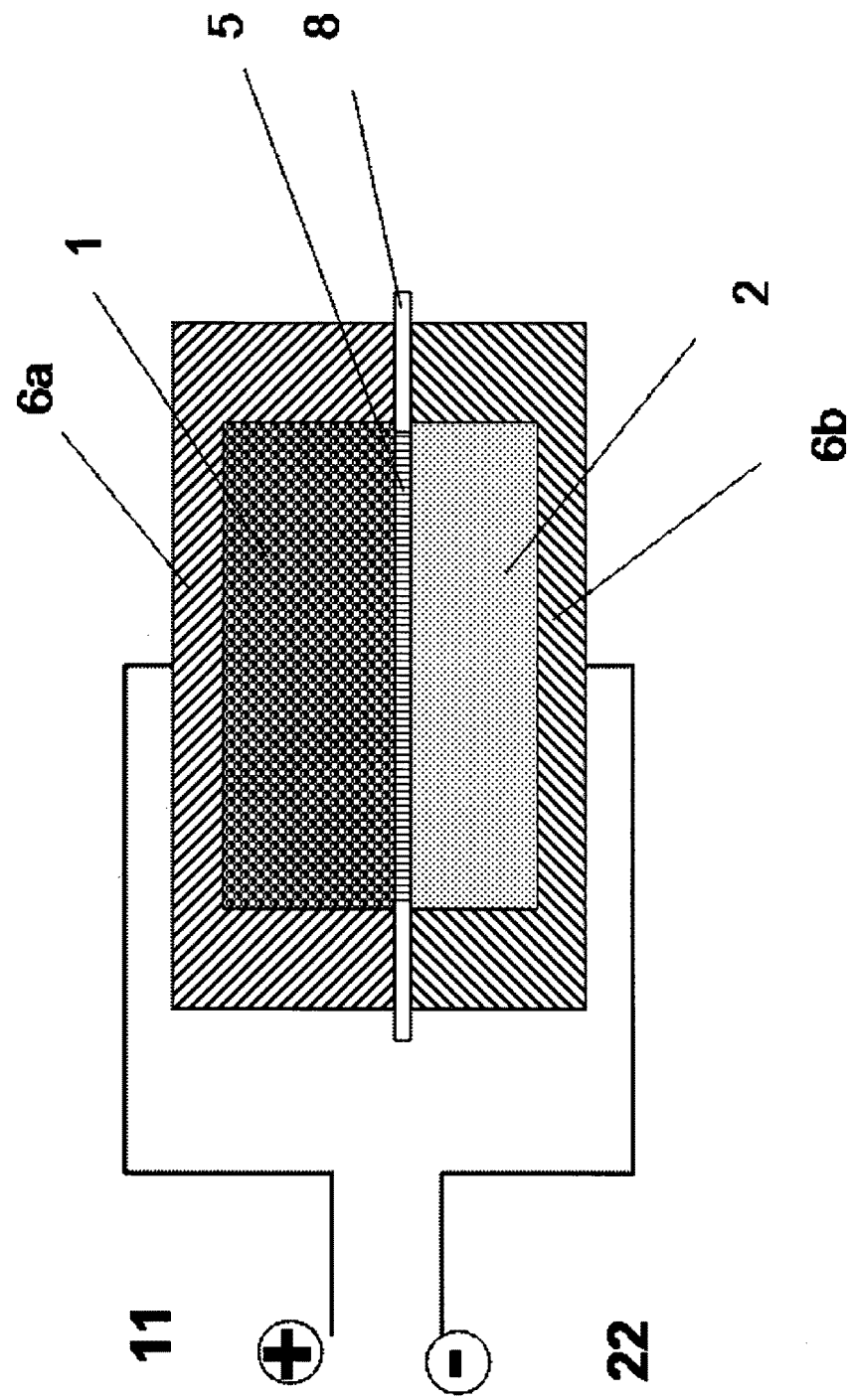
FIG. 13 is a schematic sectional view of still another embodiment of a lithium accumulator.

FIG. 13 shows another possible embodiment of a single cell lithium accumulator. Similar to the accumulator in FIG. 10, the accumulator body, made of aluminum, consists of two analogous hollow sections: an upper body 6a and a lower body 6b. Unlike the previous embodiment, the hollow space of the upper body 6a is filled with a material of a first electrode 1 as a positive electrode and the hollow space of the lower body 6b is filled with a material of a second electrode 2 as a negative electrode. The bodies 6a and 6b are provided with their corresponding poles i.e. the upper body with the first pole 11 as a positive pole and the lower body 6b with the second pole 22 as a negative pole. The first electrode 1 and the second electrode 2 are mutually separated by a separator 5 and the upper body 6a from the lower body 6b by an insulating filler 8.

The preparation, composition and characteristics of the accumulator and its components shown in FIG. 13 are apparent from the following description.

The active $LiCo_{0.1}Mn_{1.9}O_4$ (LCMS) material with the formal potential of 4.2 V against lithium, specific surface of 10 m²/g and the hollow sphere morphology was mixed with the highly conductive carbon (Super P Li manufactured by Timcal) in the ratio 60 to 40 wt %. The mixture was pressed into the aluminum upper body 6a, forming the positive electrode. The pressing force was 15 kN. The positive electrode contained 0.736 g of the mixture with the total capacity of 39 mAh. The positive electrode was 3 mm thick and its surface area was 1.33 cm². The negative electrode was created in similar manner by pressing 0.4 g of a mixture containing 60 wt % of the active lithium titanate material $Li_4Ti_5O_{12}$ (LTS) in a micronized form and 40 wt % of the highly conductive carbon (Super P Li) into the aluminum lower body 6b. Pressing force of 15 kN was applied. The electrode was 2 mm thick and its surface area was 1.33 cm². The theoretical specific capacity of lithium titanate is 175 mAh/g and its formal potential against lithium 1.6 V. The capacity of lithium titanate in the negative electrode was matching the capacity of LCMS in the positive electrode. The electrodes separated by a separator 5 made of a bulk layer of alumina powder with 95% porosity and pressed directly onto the electrodes formed the dry accumulator. The separator sheet was few hundreds of micrometers thick. The aluminum bodies also served as the positive and negative poles of the accumulator. They were insulated from each other with an insulating filler 8—Teflon seal. The accumulator was filled with the electrolyte consisting of 0.9M $(CF_3SO_2)_2NLi$+0.1M $LiBF_3$ lithium salts dissolved in γ-Butyrolacton (GBL)+Propylene Carbonate (volume 0.9/0.1). Then the accumulator was hermetically closed.

Figure 14:
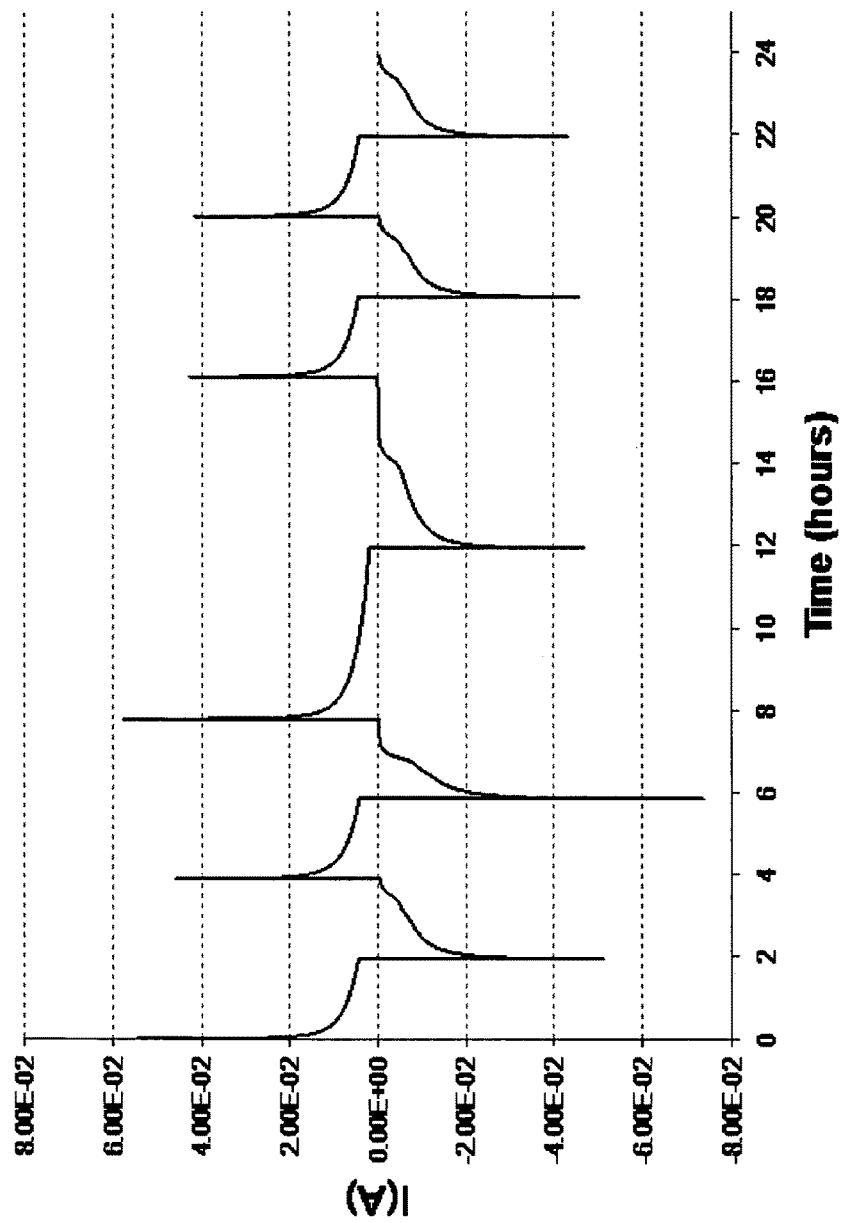
FIG. 14 shows time related charge and discharge characteristics of an accumulator described in example 6.

The capacity of the accumulator was 39 mAh and its formal voltage 2.5 V. The accumulator was charged at 2.9 V and discharged at 1.9 V in series of 10 cycles. The charge/discharge time intervals were 7000 and 15000 seconds and capacity exchanged in the short interval was consistently around 40%. A plot of the third cycling series is shown in FIG. 14 with the corresponding values organized in the following Table 1

| Cycle | Capacity (mAh) | % Capacity |
| --- | --- | --- |
| 2.9 v/7000 s - c1 | 15.7 | 40% |
| 2.9 v/7000 s - c2 | −15.4 | −40% |
| 2.9 v/7000 s - c3 | 15.7 | 40% |
| 1.9 v/7000 s - c4 | −16.0 | −41% |
| 2.9 v/15000 s - c5 | 22.5 | 58% |
| 1.9 v/15000 s - c6 | −20.4 | −53% |
| 2.9 v/7000 s - c7 | 15.3 | 39% |
| 1.9 v/7000 s - c8 | −14.7 | −38% |
| 2.9 v/7000 s - c9 | 15.1 | 39% |
| 1.9 v/7000 s - c10 | −14.5 | −37% |

Figure 15:
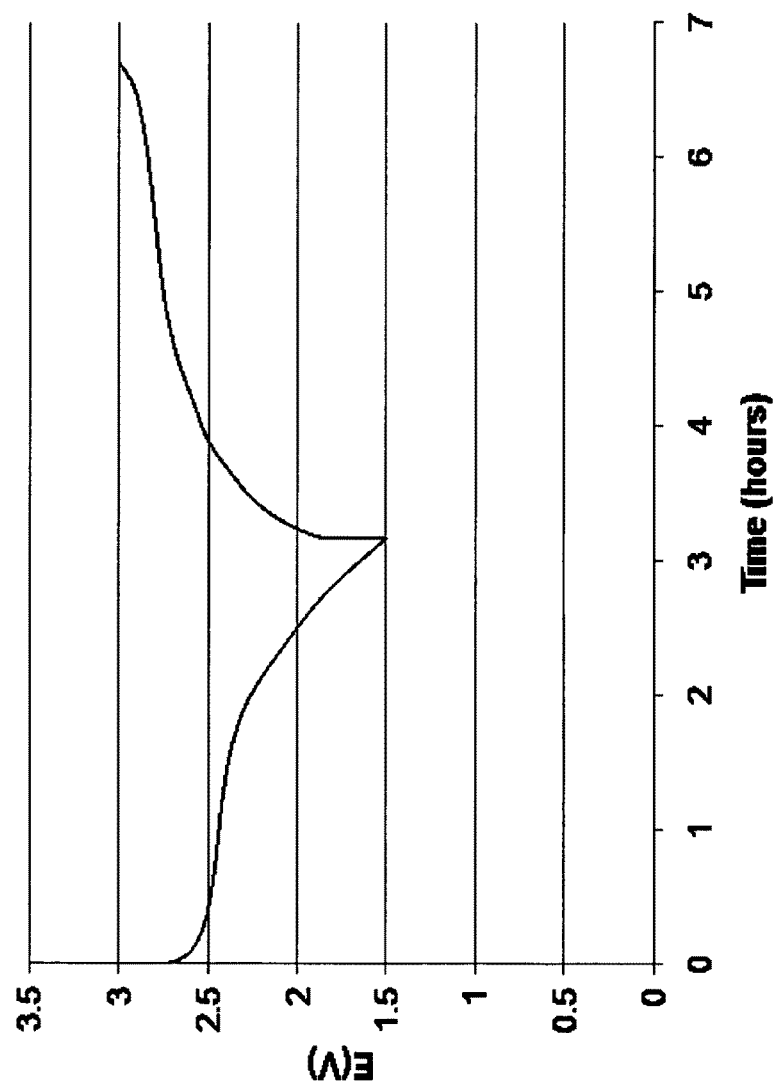
FIG. 15 shows a galvanostatic cycle of an accumulator described in example 6.

FIG. 15 illustrates a galvanic cycle in the potential range from 1.5 to 3 V. Charge and discharge by constant current +/−4 mA demonstrated 30% exchange of the accumulator capacity in 3 hours. Finally, both poles of the accumulator were interconnected and short circuit currents were measured. The discharge proceeded in one-minute pulses, with relaxation periods 1, 2 and 5 minutes as posted in FIG. 16.

Figure 16:
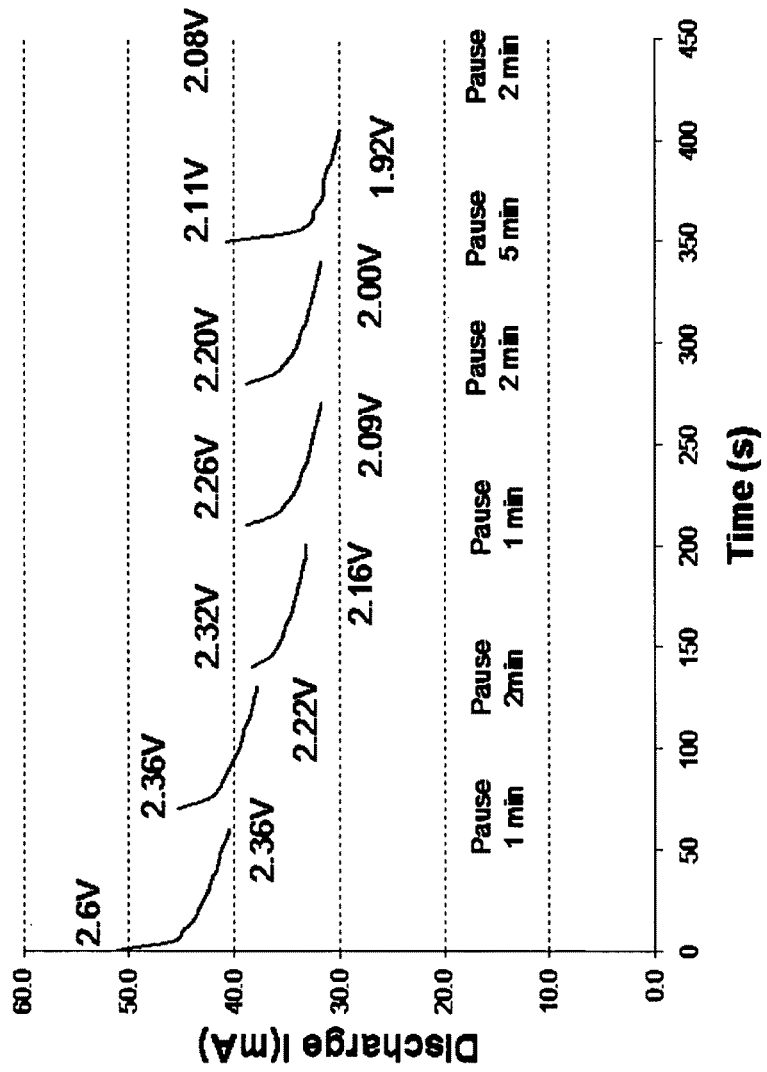
FIG. 16 shows a short-circuit discharge of an accumulator described in example 6.

Voltage parameters in FIG. 16 indexing the start and end of the discharge cycles indicate a flat and stable discharge with a small voltage drop and fast relaxation of the accumulator. Thirty percent of the accumulator theoretical capacity was discharged in 6 minutes.

EXAMPLE 7

Figure 17:
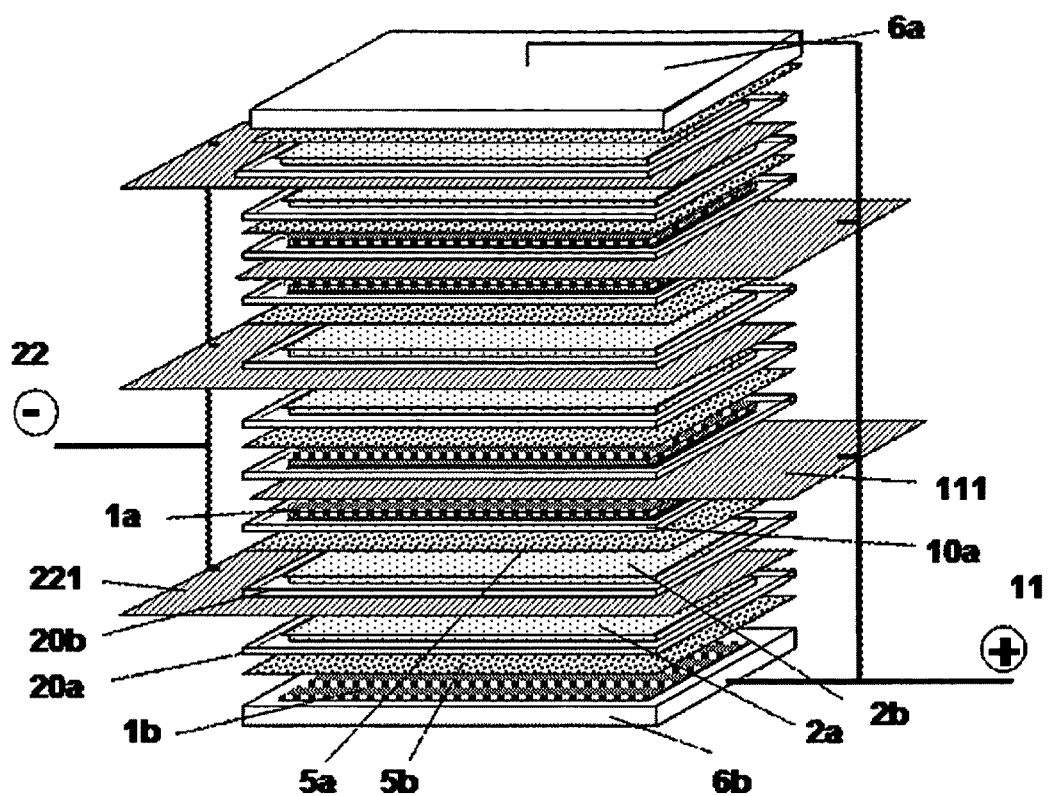
FIG. 17 is a schematic exploded perspective view of a lithium accumulator assembly consisting of multiple electrodes.

An example of a multi-electrode accumulator according to the invention is shown in FIG. 17. The accumulator is illustrated in exploded view, i.e. before the individual components were pressed down together to form the final form of the accumulator. The accumulator was assembled from three sets arranged in a stack configuration between an upper body 6a and a lower body 6b. Each set comprises two first electrodes 1a, 1b, two second electrodes 2a, 2b, and two separators 5a, 5b. The material of the first electrode 1b is pressed into an inside chamber of a lower body 6b and the material of the other first electrode 1a into a frame 10a. The material of the second electrode 2b is pressed into a frame 20b and the material of the other second electrode 2a inters a frame 20a. The electrodes 1b and 2b are divided by a separator 5b and the electrodes 1a and 2a by a separator 5a. A current collector foil 221 is disposed between the second electrodes 2a and 2b to form a contact for a wire of a negative pole 22 and a current collector foil 111 disposed between the other first electrode 1a and the next first electrode of the superposed set, to form a contact for a wire of a positive pole 11. The second set has a similar configuration as a first set with the exception that the body 6b is replaced by a frame of the same shape as the frame 10a and that the third set with the upper body 6a is a mirror image of the above described first set. All three sets arranged between the bodies 6a, 6b were filled with an electrolyte and pressed down to fit tightly together and hermetically close the accumulator. The thickness of each individual electrode in compressed conditions was determined by the thickness of the frame and size of the chambers in the bodies, which all were 3 mm. The foils and the separators were 30 micrometers thick each. Considering that the electrode surface area was 5 cm$^2$, the inside volume of the accumulator was approximately 18 cm$^3$. It is obvious that the number of sets stacked on each other is not limited and may be designed in accordance with the desired capacity of the accumulator. Any combination of electrode materials described in the preceding examples or materials described in the description of this invention may be used for the accumulator according to this example.

INDUSTRIAL APPLICABILITY

The three-dimensional construction of repeatedly chargeable lithium accumulator cell in combination with the metal lithium as a negative electrode, according to the invention, is usable for the simplification of lithium accumulator manufacture, enhanced capacity, decrease of dimensions, weight and cost and improvement of safety. This type of cells is suitable for replacing today's lead-acid accumulators with a higher voltage system, namely in the automotive industry, for the hand-held electrical tools and portable electrical and electronic appliances and devices, and it also increases the capacity of button lithium accumulator cells.

The invention claimed is:

1. A method of producing a lithium accumulator including at least one cell including a first electrode provided with a first current collector and connected to a first pole and a second electrode provided with a second current collector and connected to a second pole, the first electrode and the second electrode being separated from each other by a separator, the method comprising steps of:
   preparing a material of the first electrode from a fully inorganic mixture of dry powders of a first electron conductive component and a first active material free of organic binders and with the ability to completely absorb and extract lithium ions in the time interval of up to 20 minutes in the presence of electrolyte and having the morphology of hallow spheres with a wall thickness of maximum 10 micrometers, or a morphology of aggregates or agglomerates of maximum 30 micrometers in size,
   pressing down the mixture of dry powders to form a first electrode of minimum thickness of 0.5 mm and porosity of 25 to 90%,
   preparing a powder of electrically insulating ceramic material free of organic binders,
   pressing down the powder to form a separator with open pores, and porosity of 30 to 95%,
   preparing material of the second electrode selected from the group consisting of a compressed, homogeneous mixture of dry powder free of organic binders of second active material and a second electron conductive component, metal lithium in the form of a lithium sheet or a foil, compressed lithium sheet or foil and dendrites thereof,
   using the material of the second electrode to form the second electrode of minimum thickness of 0.5 mm and porosity of 25 to 90%,
   providing the first electrode with the first current collector and the second electrode with the second current collector,
   completing the cell by joining the first electrode, the separator and the second electrode, and connecting the current collectors, and
   encasing the completed cell together with an electrolyte comprising a non-aqueous solution of a lithium salt in an organic polar solvent into the accumulator body.

2. The method of producing the lithium accumulator of claim 1, wherein the mixture of dry powers for the first electrode is pressed down into a first frame made of a conductive metal and the material of the second electrode is placed into a second frame made of a conductive metal.

3. The method of producing the lithium accumulator of claim 1, wherein the powder of the first and second active material is prepared by drying a suspension of nano-crystals in a spray drier.

4. A method of producing the lithium accumulator according to claim 1, wherein at least one layer of a first electrode, the separator and at least one layer of a second electrode are stacked up by pressing upon each other, the accumulator body is filled with the electrolyte and closed up, the first current collector is connected to the first electrode, and the second current collection is connected to the second electrode.

5. The method of claim 4, wherein the individual layers are gradually pressed one upon the other by impact.

6. A method of producing the lithium accumulator according to claim 1, wherein compressed layers of the first electrode, the separator and the second electrode are alternatively stacked on top of each other, the accumulator body is filled with the electrolyte and closed up, the first current collectors is connected to the first electrode, and the second current collector is connected to the second electrode.

* * * * *

UNITED STATES PATENT AND TRADEMARK OFFICE
CERTIFICATE OF CORRECTION

PATENT NO. : 9,437,855 B2  Page 1 of 1
APPLICATION NO. : 12/998090
DATED : September 6, 2016
INVENTOR(S) : Prochazka, Jr. et al.

It is certified that error appears in the above-identified patent and that said Letters Patent is hereby corrected as shown below:

In the Claims

In Column 14, Line 10 (Line 14 of Claim 1) please change "hallow" to correctly read: --hollow--.

Signed and Sealed this
Fifteenth Day of November, 2016

Michelle K. Lee
*Director of the United States Patent and Trademark Office*